Jan. 15, 1935. G. S. SALZMAN 1,987,752
BEARING MANUFACTURE
Filed Aug. 30, 1930 6 Sheets-Sheet 1

INVENTOR.
George S. Salzman
BY
ATTORNEYS

Jan. 15, 1935.  G. S. SALZMAN  1,987,752
BEARING MANUFACTURE
Filed Aug. 30, 1930

Jan. 15, 1935.  G. S. SALZMAN  1,987,752
BEARING MANUFACTURE
Filed Aug. 30, 1930   6 Sheets-Sheet 4

*Fig. 7*

INVENTOR.
George S. Salzman
BY
Fay, Oberlin & Fay
ATTORNEYS

Jan. 15, 1935.　　　　G. S. SALZMAN　　　　1,987,752
BEARING MANUFACTURE
Filed Aug. 30, 1930　　　　6 Sheets-Sheet 5

INVENTOR.
George S. Salzman
BY
ATTORNEYS

Jan. 15, 1935.  G. S. SALZMAN  1,987,752
BEARING MANUFACTURE
Filed Aug. 30, 1930  6 Sheets-Sheet 6

INVENTOR.
George S. Salzman

ATTORNEYS

Patented Jan. 15, 1935

1,987,752

UNITED STATES PATENT OFFICE 1,987,752

BEARING MANUFACTURE

George S. Salzman, Cleveland, Ohio, assignor to The Cleveland Graphite Bronze Company, Cleveland, Ohio, a corporation of Ohio Application August 30, 1930, Serial No. 478,824

6 Claims. (Cl. 22—65)

This invention, relating, as indicated, to bearing manufacture is more particularly directed to the provision of a bearing of the journal type as distinguished from ball and roller bearings.

It is the object of this invention to produce a novel bearing as well as a new machine and method.

The general object of all methods of producing bearings which are used today is to provide a bearing as cheaply as possible, the chief obstacle in this field being the uniting of a bearing material with a backing material so that the two materials have an integral union. The reason for this obstacle being so hard to overcome is that backing material is usually coated with a rust resisting oil, such as palm oil.

Another difficulty is that in the plants where such bearings are produced all kinds of dirt and objectionable matter is liable to be caught between the contacting surfaces, and as a result there is a poor bond between such surfaces.

A still further and most important trouble in this field has been that where the backing metal is heated to a temperature at which it will bond with the bearing metal, previous to the joining of the two, the backing metal becomes coated with rust, unless covered immediately with some protective medium.

I have found that by the use of a relatively long backing shell, bearings may be produced expeditiously and with comparatively fewer operations, and as far as I am aware I am the first to make use of a long tube in the manufacture of bearings as described in the following pages.

To the accomplishment of the foregoing and related ends, said invention, then, consists of the means hereinafter fully described and particularly pointed out in the claims; the annexed drawing and the following description setting forth in detail one method, one product and certain mechanism exemplifying my invention, such disclosed mechanism, procedure and product constituting, however, but one of various applications of the principle of my invention.

In said annexed drawings:—

Fig. 6 is a view similar to Fig. 2 with parts magnified.

Briefly stated, my invention comprises the use of a tube of steel or similar metal suitable as a backing material for bearings, which tube may be either a seamless or welded one. A welded tube may be used because such a tube can be readily formed from a flat strip, and the cost of such formation is negligible when compared to the total cost of tubes formed in other ways. However I do not intend to be limited to welded tubes as the invention is obviously applicable to seamless tubes and in fact any other type of tube. Such a tube is rotated and during such rotation molten metal is introduced and centrifugally cast to form a lining, the tube having been previously heated to a temperature at which it will readily bond with the lining metal. After the introduction of the molten metal the tube is tilted and then returned to the horizontal position so that a uniform coating is obtained in the quickest possible manner, the tilting operation distributing the molten metal along the entire length of the tube after which rotation in a horizontal position further aids in the distribution. Following the coating operation the tube is cooled and after several of such tubes have been formed they are placed in a multiple spindle lathe, finished on the inside, and outside if desired, and then cut to the desired length.

The mechanism for producing such a bearing will now be described in detail:—

Figure 1:
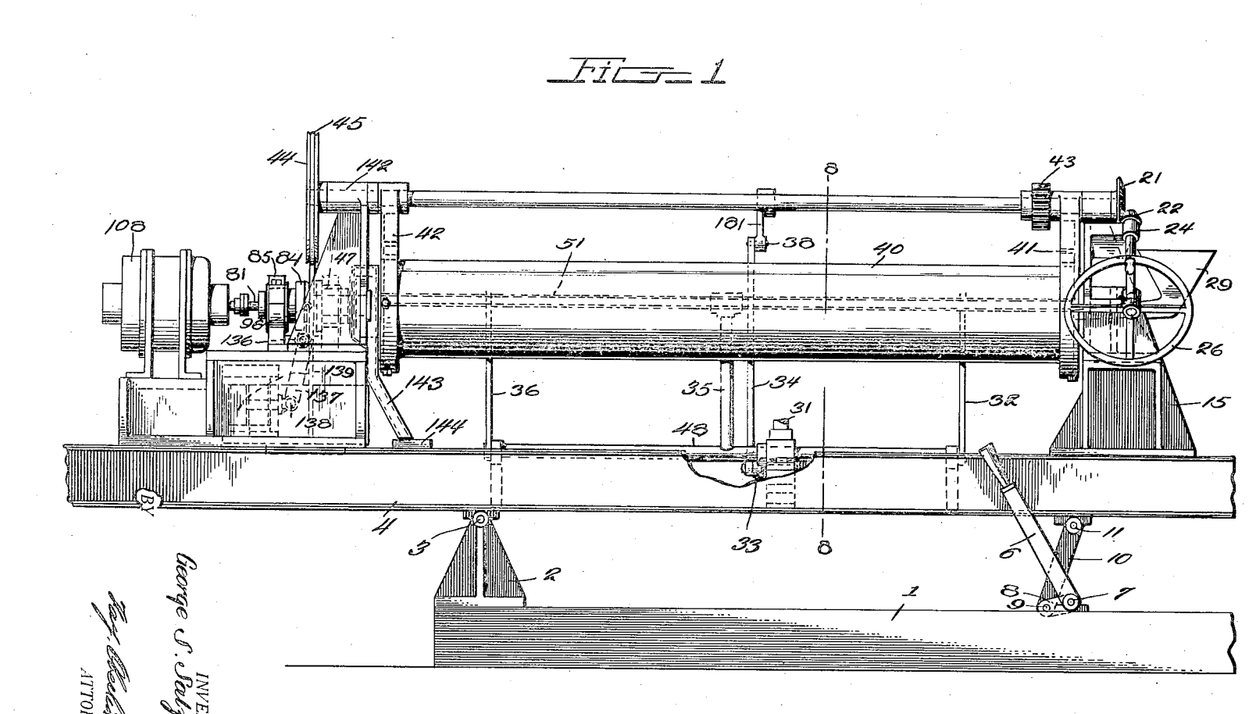
Fig. 1 is a side elevation of my improved mechanism.
Figure 2:
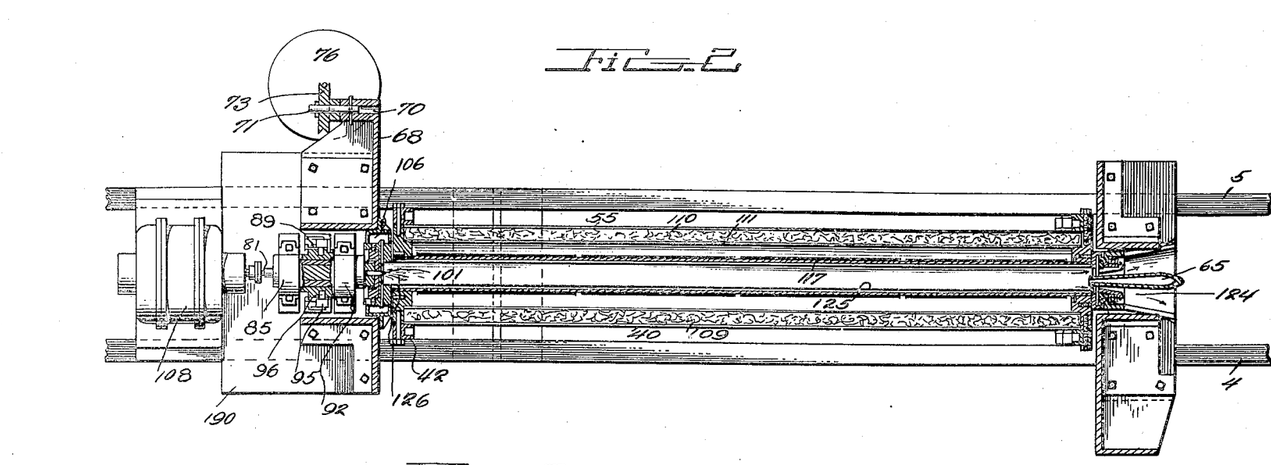
Fig. 2 is a central horizontal section of Fig. 1 with parts in elevation.
Figure 7:
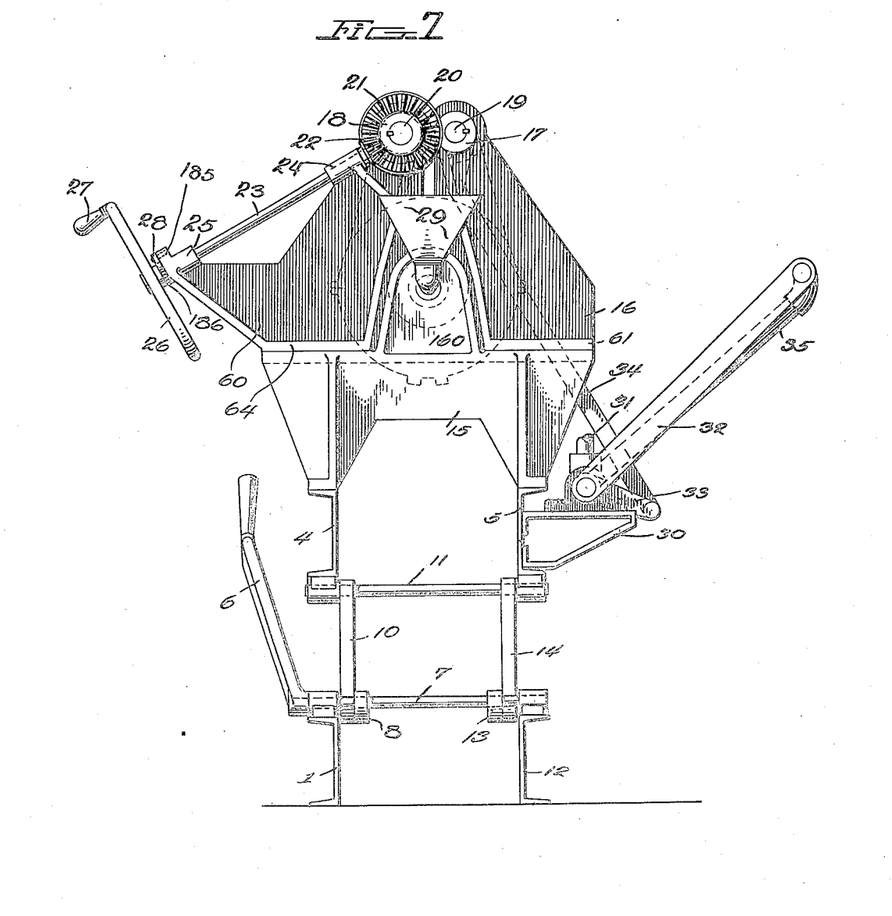
Fig. 7 is an end elevation of my apparatus taken from the right hand end.

Referring particularly to Figs. 1 and 7, a base is shown consisting of channel irons 1 and 12, which may be secured to the floor or to each other in order to provide a firm foundation. At one end of this base a standard 2 is shown which supports a shaft 3, said shaft in turn supporting a second set of channel irons and the structure thereabove is fulcrumed on the shaft 3. At the other end of the base a shaft 7 is shown, which has keyed thereto a hand lever 6, said hand lever when operated revolving with shaft 7. Two short links 8 and 13 are keyed to the shaft 7 and turn therewith, the link 8 being connected to a relatively long link 10 and a link 13 being connected to another long link 14, such connection in both instances being a pivoted one. The links 10 and 14 extend upwardly and are rotatably secured to another transverse shaft 11, the net result of all of said linkage being to produce up and down movement of the shaft 11, which in turn is transmitted to the structure supported thereabove.

This upper structure consists of two channel irons 4 and 5 which extend the entire length of the mechanism, the degree of such extent being regulated by the weight of the part supported so that the whole structure may be readily moved about the fulcrum shaft 3. A transverse supporting standard is shown at 15, such standard having legs which coincide with the upper flanges of the channel irons 4 and 5, said legs being secured to the flanges of said channel irons either by bolting or welding. Extending above the transverse standard 15 a pair of standards 16 and 60 are shown, the standard 16 serving as a support for the shaft 19 which is journaled in such standard at 17. The standard 60 is slightly larger than the standard 16 and has incorporated therein journals 24 and 25 for the reception of the shaft 23, and journal 18 for the shaft 20. The shaft 23 has at one end adjacent the journal 24 a pinion 22 which meshes with the gear 21, which gear is in turn keyed to the shaft 20. At the other end of the shaft 23 a hand wheel 26 is secured thereto, which hand wheel has a handle 27 so that movement of the shaft 20 may be easily effected. A two-way safety ratchet type pawl is shown at 28, the purpose of such a ratchet being to prevent movement of the shaft 20 when such movement is undesired. Prevention of movement of the shaft 20 is obtained by swinging of pawl 28 about the pin 185. The locking teeth on the disk 186 being dove-tailed in shape provide a means of locking the heating jacket in either open or shut position, so that when it is desired to remove the tube 125 from the machine this may be accomplished without any danger of the heating jacket falling upon the operator.

Located centrally between the standards 16 and 60 a pouring throat or funnel 29 is illustrated, said funnel being supported in an upstanding projection 160 of the transverse standard 15. At the other end of my improved apparatus there is another set of supporting standards 67 and 68 which are in turn supported upon a transverse standard 161, the last named standard having legs which rest upon and are secured to the channel irons 4 and 5. Both of the standards 67 and 68 have horizontal flanges which are bolted or secured to a platform 190 upon which a motor and clutch means are supported, and this platform is in turn supported upon the channel irons 4 and 5. The uppermost portion of the standard 67 has a journal 162 for the reception of the shaft 20, the outer end of said shaft having a large disk 44 keyed thereto around which a cable 45 extends, said cable being secured to said disk by some such means as a screw 151. The standard 68 has a journal 163 for the reception of shaft 19, said standard also having a projecting portion which contains another journal 70 for the reception of a pin 71. This pin is held in place by retaining member 72, and forms a support for a rotating disk 73, said disk being held in position by a washer 75 and a pin 74. The cable 45 extends over the small disk 73 and has attached to its end a weight retaining member 80, a series of weights being shown on said member, said weights being designated at 76, 77, 78, and 79. The purpose of the weights is to counterbalance the effect of the heating jacket so that when said heating jacket is desired to be elevated, such elevation can be done quite easily, without having to lift the total weight of the heating jackets.

Figure 8:
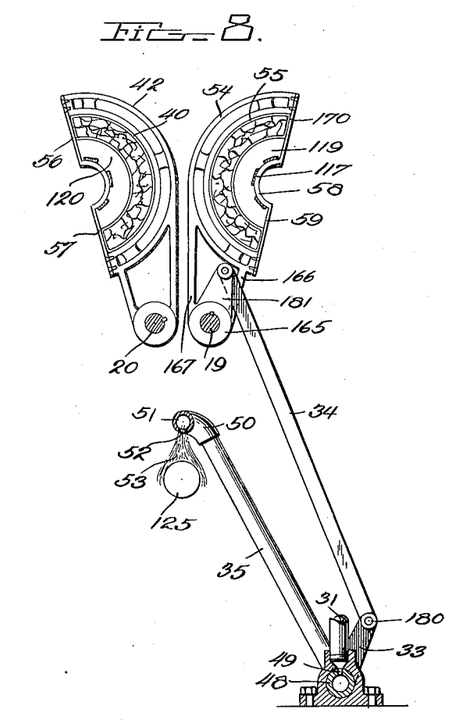
Fig. 8 is a detail vertical section taken on the line 8—8 of Fig. 1.

The heating jacket comprises two parts, as best shown in Fig. 8, one part consisting of a hub 165, two arms 166 and 167 and a semi-circular channel iron member 54, said hub being keyed to the shaft 19 so that rotation of said shaft elevates or lowers said heating jacket.

Referring now to Fig. 6 it will be seen that the semi-circular channel iron 54 is held to a plate 109 by means of a cap screw 112, there being a metallic sheathing 55 also secured between said channel iron and plate. This plate 109 has a shoulder upon which an inner sheathing 111 rests, the space between the inner and outer sheathing being filled with an insulating medium 110 which may be asbestos. On the inner periphery of the plate 109 a half tube 58 is illustrated, which tube has extensions 59 and 170 so that said half tube may be held in position with respect to the member 54. Between the half tube 58 and the inner sheathing 111, a space will be seen to exist, this space being the heated area. In this particular instance I have chosen to heat the tube by means of strip heaters which are shown at 117, but obviously other forms of heating may be used, such as gas firing. Both halves of the heating jacket are identical, and the above description of the end of one half is thought to suffice, as the ends are similar in all respects, as shown in Fig. 8.

Referring now to Figs. 1 and 6, a means of rotating the tube 125 will be seen which consists of a motor 108 and a shaft 81, said shaft being splined so that a sleeve 84 may be moved longitudinally with respect to said shaft. Movement of the shaft 81 is transmitted to the arbor 105 by means of the flanged portions of the member 82, which flanges are secured to a plate 107 by means of cap screws 102, the plate being in turn secured to the arbor by set screws 104. The member 82 has a retaining nut 83 in threaded engagement at one end in order that movement of the sleeve 84 may be transmitted to the member 82, and thus to the arbor or head ring 105. Obviously, the retaining nut 83 functions upon movement away from the head ring, movement in the opposite direction being accomplished by means of a shoulder 200 on the member 82. Thus it will be seen that the head ring 105 may be easily and quickly brought into and out of engagement without affecting the rotating connection, as the member 82 merely slides upon the splined shaft 81. The purpose of the packing in the packing nut which is located at each end of the sleeve 84 adjacent to the ball bearings, is to prevent the escape of gas which is admitted to a chamber 98 surrounding the member 82 through the inlet 90, and this member 82 has a central recess in one end shown at 100, the space 98 communicating with this recess by means of small passages 99. The recess 100 tapers to a jet at 101 so that gas is expelled at this point into the interior of the tube 125. The ball bearing shown at 87 provides a means of support for the shaft 82 which offers the least resistance to the rotation of said shaft, and this ball bearing is similar to another ball bearing situated at the other end of the shaft adjacent the shoulder 200. An enclosing sleeve is shown at 84, which slides longitudinally in order to grip and release the tube 125, the sleeve being held in position by the clamping members 85 and 92, said clamping members being secured by means of the bolts 86, 91, 94, and 97. The sleeve also has a boss which provides a recess for the reception of a pin 89, the opposite side of said sleeve having a similar pin 96 engaged therein and these pins are in turn held by the members 95 and 88. The member 95 is the end of a link 141, said link being part of a jor link 137, there being a connecting shaft 0 extending transversely and having another k 142 at the end of said shaft. The major link is connected at 138 to an air cylinder 139 so that movement of the piston therein actuates the link which in turn causes the sleeve to slide back and forth, said linkage being fulcrumed at 136, (see Fig. 1). The opposite end of the tube 125 is held in a head 129, which head is fixed with respect to longitudinal movement, but is otherwise free to rotate, it being connected by means of set screws 130 to the bearing ring 131. Between the bearing ring 131 and the throat 179 a ball bearing assembly is located which permits rotation of the head ring and its parts. From this it will be seen that the tube 125 may be easily and quickly released and gripped by means of air pressure, actuating the head ring 105 which in turn pushes the tube 125 against the head 129.

In order to introduce a means of treating the interior surface of the tube 125 so that it will be readily united with the lining, an inlet is provided which consists of a throat 29 and a horizontal portion 65, the last named portion being tipped slightly from the horizontal so that any material in a fluid condition will readily pass to the tube 125. At the other end of the tube, surrounding the head ring 105, a drain housing is illustrated at 170, said housing being of such construction that a chamber 106 is provided, the lowermost portion of said chamber having a drain 143 which connects to a pan 144. The head ring 105 has radial passages 107 extending therethrough so that any excess liquid may be drained from the interior of the tube 125, thrown out through the passages 103 and will then be caused to flow down through the passage 143 and collect in the pan 144. By this means a cleaning liquid may be introduced into the tube and drained therefrom and likewise the tube may be washed with a flux and any excess of such a flux may be easily drained off. If it is desired to indent or roughen the interior surface of the tube this may be done very easily when the tube has its initial shape, that is, when it is flat prior to the welding operation, or by broaching or similar means in the case of a seamless tube.

Figure 3:
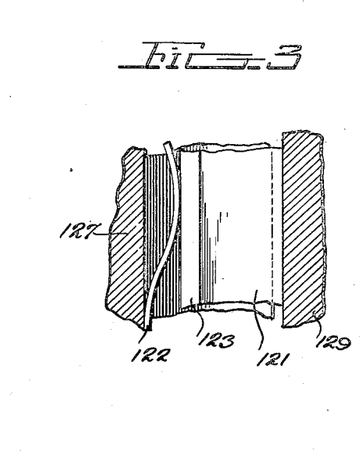
Fig. 3 is a detail view of the sealing ring.
Figure 4:
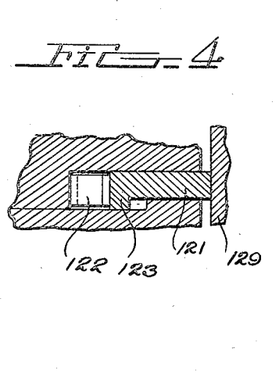
Fig. 4 is another detail view of the sealing ring taken transversely to Fig. 3.

Referring now to Figs. 3, 4 and 6, the means of sealing the heat within the heating jacket is illustrated, such means consisting of a sealing ring and a spring. The ring itself consists of a semicircular member 121 which is held in the jacket plate 127 by means of a shoulder 123 and pressed against the head ring 129 by means of the spring 122, the head rotating and the sealing ring being stationary. In this way all of the heat provided by the heating elements is used to heat the tube and is not lost. When the head ring 105 is withdrawn in order to remove the tube after lining, the ring will merely slip out until the shoulder engages a shoulder in the plate. As a means of preventing the introduction of oil and its consequent injurious effects an oil guard in the form of packing such as shown at 133 is placed between the stationary outer pouring throat 179 and the rotating head. Another packing is shown at 178 which is provided for the same purpose.

Referring now to Figs. 1 and 8, a means of cooling the tube after it has been lined, is shown, which means automatically operate upon the elevation of the heating jacket to the position shown in Fig. 8. A cooling fluid inlet pipe is shown at 31 from which fluid passes through the valve 49 to the pipe 48, and thence through the pipe 35 to the spray pipe 51. The last two pipes are connected by the T 50. The spray pipe extends the full length of the tube 125 and has perforations 52 therein so that cooling fluid can be sprayed over the tube. A short link 33 is rigidly connected to the lower pipe 48 and movement of this link opens and shuts the valve 49, which controls the fluid. The short link 33 is connected to an arm 181, said arm being fixed to the shaft 19. From this it will be seen that as the shaft 19 rotates in a clockwise direction, as viewed in Fig. 8, the long link 34 will be pushed down, the short link 33 will also be turned in a clockwise direction which will revolve the pipe 48 so that the valve 49 becomes closed. The rotation of the pipe 48 causes the pipe 35, which is fixed thereto to revolve in a clockwise direction and the parts will assume the position shown in Fig. 7. In order to steady the spray pipe a pair of links are placed in both ends thereof, said links being shown at 32 and 36 and being fixed to the lower pipe 48 and rotatably engaging the spray pipe 51.

Figure 9:
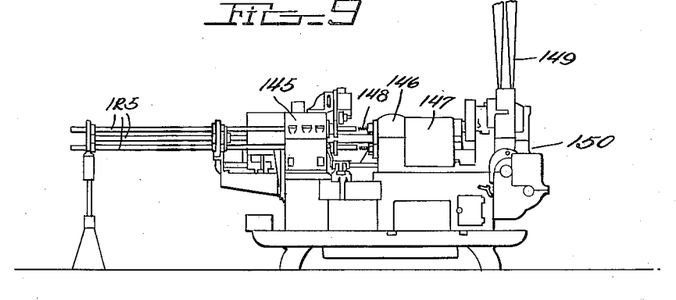
Fig. 9 is an elevation of a multiple spindle lathe.
Figure 10:
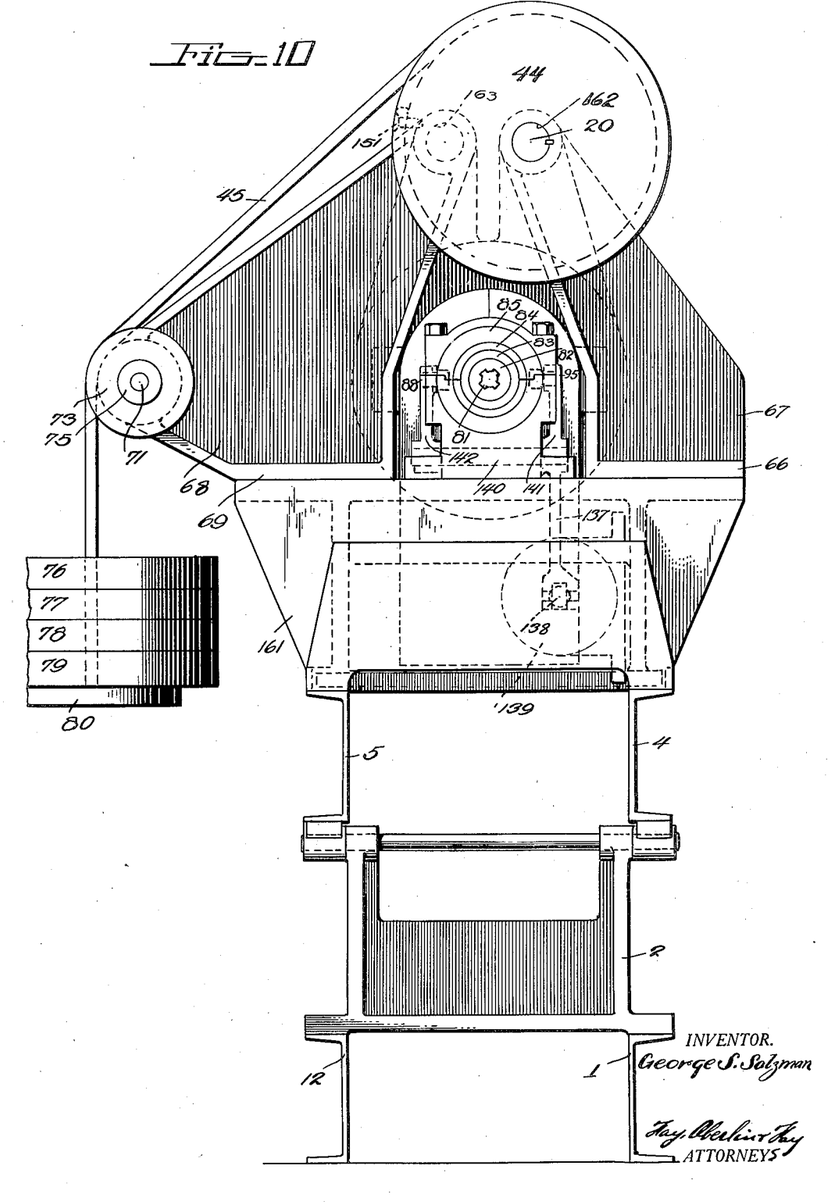
Fig. 10 is an end elevation of my novel apparatus taken from the left hand end.

In order to minimize the expense of finishing and cutting the bearings to size I make use of a multiple spindle machine which is shown in Fig. 9, and consists of a work carrier 145, which in this instance carries four pieces of work. A tool carrier is shown at 146 with tools 148 projecting therefrom, said tools being actuated by means of gears in the box 147, and these gears being in turn actuated by the belt 149, it being of course understood that a motor may be used in place of the belt. By the use of this machine four pieces of stock may be finished at one time and then cut off, whereupon the stock will be moved into position for the same operation.

In order to provide an efficient means of preventing oxidation of the interior of the tube 125 a means of flowing gas through the tube is provided, the gas entering the tube at one end and being expelled at the other, and burning at a point of exit which is shown in Fig. 6, at 124. The gas enters the inlet 90 by means of a flexible connection (not shown) and passes into the chamber 98 which surrounds the shaft 82, after which it is expelled through the jet 101. It immediately expands into the tube and passes through the tube carrying all oxygen in the atmosphere with it, and when it has had sufficient time to reach the point 124 it is ignited and burns. The gas here serves a double function, first, preventing oxidation of the tube which occurs very easily upon steel when brought to a high temperature, second, it maintains the narrow throat portion 65 in a heated condition and thus prevents any solidification or cooling of the molten metal with which the tube is to be lined. This gas while preventing oxidation has no effect upon cleaning fluids or fluxes and does not in any way retard the bonding of the lining material with the tube. Any gas which might escape through the parts 107 and out through the drain pipe 143 will be of a negligible quantity, but if such escaping gas were objectionable it could easily be overcome by the provision of a suitable valve in the drain pipe 143.

Figure 5:
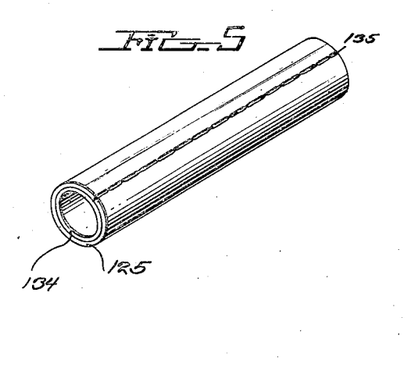
Fig. 5 is a perspective view of a bearing manufactured by my improved method.

A portion of the tube 125 is shown in Fig. 5 after it has been lined with a bearing material as described above. This particular example showing a welded construction, the butt being illustrated at 135 and the lining of babbitt or other suitable bearing material being shown at 134. The invention, as stated previously, does not necessarily have to be carried out with a welded tube as exhaustive tests have proven that seamless tubes can be manufactured into bearings just as expeditiously. I have found however that where the use of welded tubes is permissible, that microscopic voids are formed between the welds in some instances, the length of these voids depending upon the speed at which the tube is welded and other factors, and I have also found that these voids may provide an anchorage of quite some value where full round bearings are used.

The method of producing my improved bearing is as follows:—

A tube of relatively light construction and relatively long length is placed between the head rings 129 and 105, after which gas is turned on and passes in a manner hereinbefore described, through the tube and out through the throat 179 where it is ignited. The heating jacket is then lowered from the position shown in Fig. 8 until it assumes the position shown in Fig. 1, this being accomplished by turning the hand wheel 26. The hand wheel 26 has suitable connections which provide direct engagement with the shaft 20 and movement is imparted to the shaft 19 by means of the gear 43 on shaft 20, meshing with a similar gear on the shaft 19. Both of said shafts and their attached heating jackets are readily moved by hand by reason of the counterweights attached at the other ends of said shafts which offset the weight of the heating jackets. The heat is then turned on, or in some instances, may be always turned on, and the temperature of the tube 125 is raised to a point at which it will readily unite with a lining material. After this temperature has been reached molten metal is poured into the funnel 29 and passes down through the throat 65 and into the tube, the tube being rotated all the time. The hand lever 6 is then manipulated to tilt the tube 125 so that the entire inner surface may be instantly coated with molten metal. This molten metal may be babbitt, bronze or any other suitable material which can serve as a bearing surface. In the event that the tube is desired to be cleaned and surface treated these operations will take place before the admission of the molten metal, and such cleaning fluid, flux or other liquid, may be readily drained from the interior of the tube through the drain ports 103, and then out through the drain pipe 143. After the tube has been cleaned and lined the gas is turned off and the heating jacket is lifted by turning the hand wheel 26 in a clockwise direction, as viewed in Fig. 1.

Simultaneously with the elevation of the heating jacket, a cooling means is brought into operation and when the halves of the heating jacket have reached the position shown in Fig. 8, cooling fluid 53 will fall over the tube and effectively cool it. The cooling fluid spray is then cut off and the tube is removed by means of retracting the head ring 105. The tube is now lined ready for finishing and is next placed in the multiple spindle machine so that a number of said tubes may be finished at one time. In this particular instance four tubes are reamed out and cut off and the bearing is ready for the final finishing operations.

From the foregoing description it will be seen that a novel machine and method has been provided which enables me to produce bearings at an extremely low cost. It will also be seen that the process involves the cleaning and lining of a tube of relatively long length, and that such a process can be carried out without the least danger of oxidation or the presence of oil and dirt which are known to be the three most troublesome factors in the manufacture of lined bearings. Another advantage of my improved machine is that a long length of tubing may have a lining centrifugally cast thereagainst and this lining will be of uniform thickness and density because of the ability that this machine possesses to be tilted at most any desired angle. Another advantage flowing from the use of my improved machine is that all heat losses, which are usually present in any mechanism involving the heating and rotation of an article, such as a tube are prevented. A further and very important advantage of my method and machine is that one man may operate the machine and produce as many bearings as are produced by several men using present day methods. Another appealing feature of this invention, and one which is most desired in the practical field today, is that of speed. The pipe may be quickly gripped in place by means of the air control clutch arrangement so that placing the tube in and out of engagement is merely a matter of seconds, and the inner surface of the tube may be quickly cleaned by rapid rotation and tilting to drain off any cleaning fluid. A further speedy operation will be noted in that the heating jackets are counter-balanced so that merely turning the hand wheel quickly elevates the heating jacket, and this elevation in turn automatically brings a cooling fluid spraying device into operation. Going further, a number of tubes are then placed in a multiple spindle machine and operated upon simultaneously to produce a number of bearings at one time, which are ready for the final finishing operations.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. The combination in an apparatus of the type described, of means for rotating a tube, means for heating said tube, and means for introducing molten metal into said tube, means for maintaining the atmosphere within said tube free from oxygen, an insulated jacket surrounding said heating means and means for distributing said molten metal in said tube, said jacket being supported in a manner permitting removal from the immediate vicinity of said tube.

2. The combination in an apparatus of the type described, of means for rotating a tube, means for heating said tube, and means for introducing molten metal into said tube, means for maintaining the atmosphere within said tube free from oxygen, an insulated jacket surrounding said heating means and means for distributing said molten metal in said tube, said jacket supported in a manner permitting removal from the immediate vicinity of said tube, and automatic cooling means operated by such removal.

3. In an apparatus of the character described, a tiltable base, a motor, a tube gripping means, a clutch means between said motor and gripping means, a pouring throat extending into said tube and means for preventing the oxidation of said tube, heating means surrounding said tube, said means being in turn surrounded by an insulated jacket and contained therein, said jacket being split, and means for elevating said jacket above said tube.

4. In an apparatus of the character described, a tiltable base, a motor, a tube gripping means, a clutch means between said motor and gripping means, a pouring throat extending into said tube and means for preventing the oxidation of said tube, heating means surrounding said tube, said means being in turn surrounded by an insulated jacket and contained therein, said jacket being split, means for elevating said jacket above said tube, and means for cooling said tube consisting of a spray.

5. In an apparatus of the character described, a tiltable base, a motor, a tube gripping means, a clutch means between said motor and gripping means, a pouring throat extending into said tube, and means for preventing the oxidation of said tube, heating means surrounding said tube, said means being in turn surrounded by an insulated jacket and contained therein, said jacket being split, means for elevating said jacket above said tube, and means for cooling said tube consisting of a spray, said spray being automatically operated by the elevation of said heating jacket.

6. In an apparatus of the character described, a tiltable base, a motor, a tube gripping means, a clutch means between said tube, and means for preventing the oxidation of said tube, heating means surrounding said tube, said means being in turn surrounded by an insulated jacket and contained therein, said jacket being split, means for elevating said jacket above said tube, and a counter-weight attached to said jacket to facilitate lifting thereof.

GEORGE S. SALZMAN.